United States Patent

Brumme et al.

(10) Patent No.: US 7,743,363 B2
(45) Date of Patent: Jun. 22, 2010

(54) EXTENSIBLE META-DATA

(75) Inventors: Christopher W. Brumme, Mercer Island, WA (US); James H. Hogg, Bellevue, WA (US); James S. Miller, Bellevue, WA (US); Sergey Lidin, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 460 days.

(21) Appl. No.: 11/249,784

(22) Filed: Oct. 13, 2005

(65) Prior Publication Data

US 2007/0088716 A1  Apr. 19, 2007

(51) Int. Cl.
*G06F 9/44* (2006.01)

(52) U.S. Cl. .................. 717/120; 717/168; 717/170

(58) Field of Classification Search .......... 717/105, 717/115, 121, 136, 120, 122, 168, 170
See application file for complete search history.

(56) References Cited

U.S. PATENT DOCUMENTS

| | | | |
|---|---|---|---|
| 6,003,039 A | 12/1999 | Barry et al. | |
| 6,199,198 B1 * | 3/2001 | Graham | 717/105 |
| 6,549,922 B1 | 4/2003 | Srivastava et al. | |
| 2002/0099726 A1 * | 7/2002 | Crudele et al. | 707/200 |
| 2002/0103785 A1 | 8/2002 | Harvey | |
| 2003/0005349 A1 * | 1/2003 | Shrader et al. | 714/2 |
| 2003/0028549 A1 | 2/2003 | Hartel et al. | |
| 2003/0074367 A1 | 4/2003 | Chaler et al. | |
| 2004/0117397 A1 | 6/2004 | Rappold et al. | |
| 2004/0158820 A1 * | 8/2004 | Moore et al. | 717/136 |
| 2004/0177319 A1 | 9/2004 | Horn et al. | |
| 2004/0201600 A1 | 10/2004 | Kakivaya et al. | |
| 2004/0268305 A1 | 12/2004 | Hogg et al. | |
| 2005/0066320 A1 * | 3/2005 | Petig et al. | 717/146 |
| 2005/0086343 A1 | 4/2005 | Chellis et al. | |
| 2005/0108684 A1 * | 5/2005 | Sohn et al. | 717/120 |
| 2006/0161895 A1 * | 7/2006 | Speeter et al. | 717/121 |
| 2007/0256055 A1 * | 11/2007 | Herscu | 717/115 |

OTHER PUBLICATIONS

Gough, "Virtual machines, managed code and component technology", 4-05, Proceedings, 2005 Australian Volume, Issue, pp. 5-12.*
Lorcan Dempsey, UKOLN, University of Bath, UK and Stuart L. Weibel, OCLC Office of Research, Dublin, Ohio, USA; The Warwick Metadata Workshop: A Framework for the Deployment of Resource Description; 2.1 the Dublin Core; Jun. 30, 1996; 12 pages.
Dr. Katherine L. Morse; Summary of the 2003 Composable Mission Space Environments Workshop; Arlington, VA, pp. 313-323.

* cited by examiner

*Primary Examiner*—Jason Mitchell (57) ABSTRACT

Meta-data of compiled code may have a corresponding description of the schema for meta-data, to allow for deviations from a schema standard.

15 Claims, 4 Drawing Sheets

EXTENSIBLE META-DATA

BACKGROUND

A runtime execution environment may serve as at least one of an application programming and application execution platform. As an application programming platform, a runtime execution environment may compile targeted applications, which may be written in one of multiple computing languages, into an intermediate language or byte-code, for example.

SUMMARY

The meta-data stream may include one or more data constructs to provide a description of the schema for meta-data corresponding to an application compiled in a managed execution environment.

DESCRIPTION OF THE DRAWINGS

The present description references the following figures.

DETAILED DESCRIPTION

Extensible meta-data and associated technologies are presently described.

Extensible meta-data, as described herein, may pertain to meta-data corresponding to applications compiled in either of a managed execution environment or an unmanaged execution environment. More particularly, according to the example implementations described herein, meta-data corresponding to at least portions of the applications may be rendered extensible without adversely affecting execution within the execution environment. Such applications may be compiled for execution on an execution platform implemented in one or more devices, or nodes, in a network environment.

"Assembly" as used herein, may refer to a unit of deployment or, more particularly, a versionable unit of deployment for code.

"Meta-data," as described herein, may refer to data that describes other data, particularly compiled code. Meta-data may, for example, provide detailed amounts of information about one or more data elements or a descriptive item about data.

"Schema," as described herein, may refer to data that defines data structures as well as types of content that each data element within the structure may contain.

Figure 1:
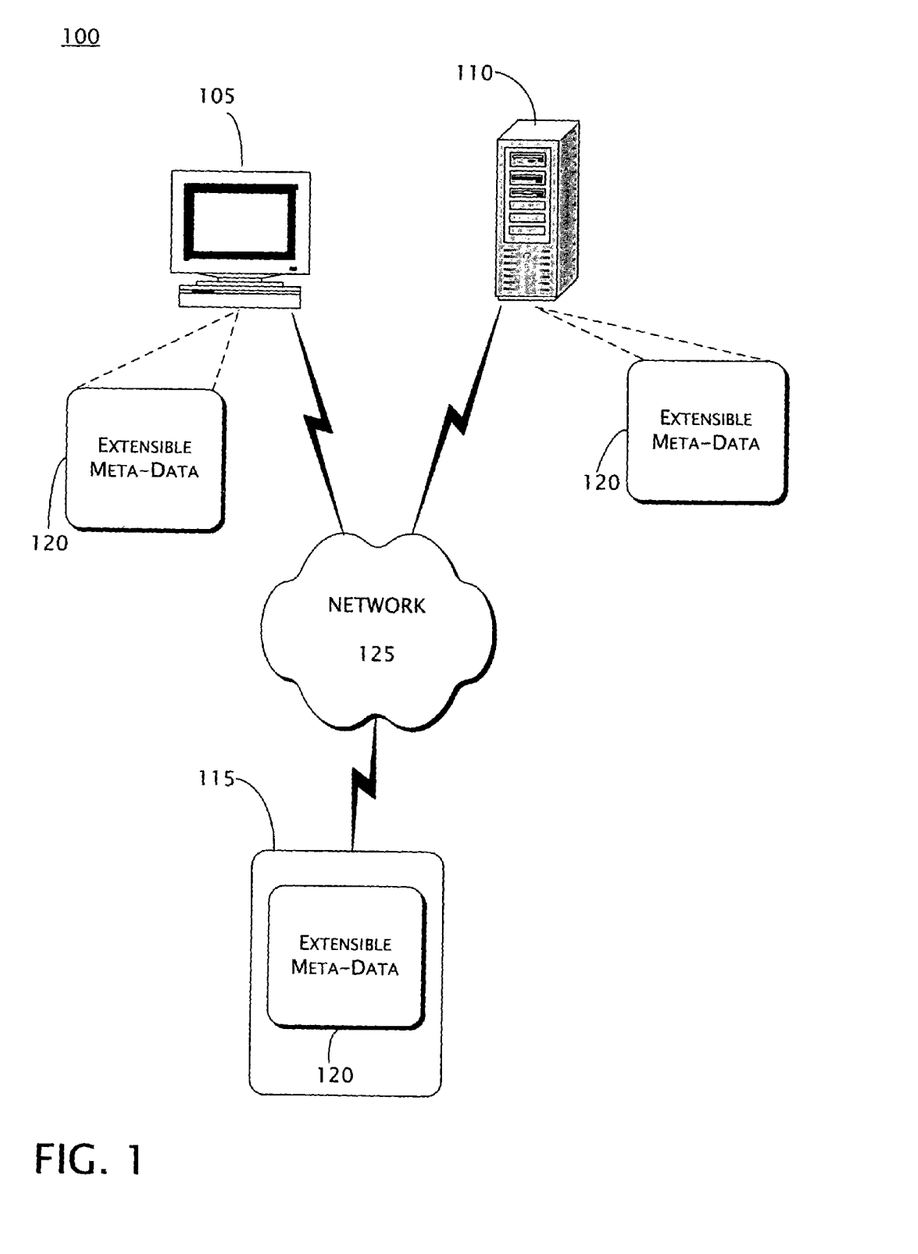
FIG. 1 shows devices communicating over a network, with the devices implementing example technologies related to extensible meta-data.

FIG. 1 shows example network environment 100 in which example technologies related to extensible meta-data may be implemented, although such example technologies are in no way limited to network environments. Such technologies may include, but are not limited to, tools, methodologies, and systems, associated with extensible meta-data 120, as described herein. More particularly, the tools, methodologies, and systems may be implemented for formatting, reading, or analyzing meta-data, regardless of whether or not the meta-data is extensible.

In FIG. 1, client device 105, server device 110, and "other" device 115 may be communicatively coupled to one another via network 125; and, further, at least one client device 105, server device 110, and "other" device 115 may be capable of the aforementioned technologies.

Client device 105 may represent at least one of a variety of known computing devices, including a desktop personal computer (PC), workstation, mainframe computer, Internet appliance, or set-top box capable of formatting, reading, or analyzing meta-data associated with an application, program, function, or other assemblage of programmable and executable code. Client device 105 may further represent at least one of any device that is capable of being associated with network 125 by a wired and/or wireless link, including a mobile (i.e., cellular) telephone, personal digital assistant (PDA), laptop computer, etc. Further still, client device 105 may represent the client devices described above in various quantities and/or combinations thereof. "Other" device 115 may also be embodied by any of the above examples of client device 105.

Server device 110 may represent any device that is capable of providing any of a variety of data and/or functionality to client device 105 or "other" device 115 in accordance with at least one implementation of extensible meta-data 120. The data may be publicly available or alternatively restricted, e.g., restricted to only certain users or only if an appropriate subscription or licensing fee is paid. Server device 110 may be at least one of a network server, an application server, a blade server, or any combination thereof. Typically, server device 110 may represent any device that may be a content source, and client device 105 may represent any device that may receive such content either via network 125 or in an off-line manner. However, according to the example implementations described herein, client device 105 and server device 110 may interchangeably be a sending node or a receiving node in network environment 100. "Other" device 115 may also be embodied by any of the above examples of server device 110.

"Other" device 115 may represent any further device that is capable of implementing extensible meta-data 120 according to one or more of the example technologies described herein. That is, "other" device 115 may represent any software-enabled computing or processing device that is capable of at least formatting, reading, or analyzing meta-data associated with an application, program, function, or other assemblage of programmable and executable code. Thus, "other" device 115 may be a computing or processing device having at least one of an operating system, an interpreter, converter, compiler, or runtime execution environment implemented thereon. These examples are not intended to be limiting in anyway, and therefore should not be construed in that manner.

Network 125 may represent any of a variety of conventional network topologies and types, which may include wired and/or wireless networks. Network 125 may further utilize any of a variety of conventional network protocols, including public and/or proprietary protocols. Network 125 may include, for example, the Internet as well at least portions of one or more local area networks (also referred to, individually, as a "LAN"), such as an 802.11 system or, on a larger scale, a wide area network (i.e., WAN"); or a personal area network (i.e., PAN), such as Bluetooth.

Computer architecture in at least one of devices 105, 110, and 115 has typically defined computing platforms in terms of hardware and software. Software for computing devices may be categorized into groups, based on function, which may include: a hardware abstraction layer (alternatively referred to as a "HAL"), an operating system (alternatively referred to as "OS"), and applications.

A runtime execution environment may reside between an OS and an application, and serve as a space in which the application may execute specific tasks on any one or more of processing devices 105, 110, and 115. More particularly, a runtime execution environment may enhance the reliability of the execution of applications on a growing range of processing devices 105, 110, and 105, including servers, desktop computers, laptop computers, and mobile processing/communication devices by providing a layer of abstraction and services for an application running on such devices, and further providing the application with capabilities including memory management and configuration thereof.

A runtime execution environment may serve as at least one of an application programming and application execution platform.

As an application programming platform, a runtime execution environment may compile targeted applications, which may be written in one of multiple computing languages, into an intermediate language (hereafter "IL") or bytecode. IL is typically independent of the platform, and the central processing unit (hereafter "CPU") executes IL, which is a higher level language than many CPU machine languages.

As an application execution platform, a runtime execution environment may interpret compiled IL into native machine instructions. A runtime execution environment may utilize either an interpreter or a compiler (e.g., "just-in-time," alternatively "JIT," compiler) to execute such instructions. Regardless, the native machine instructions may then be directly executed by the CPU. Since IL is CPU-independent, IL may execute on any CPU platform as long as the OS running on that CPU platform hosts an appropriate runtime execution environment.

Examples of runtime environments, in which technologies associated with extensible meta-data 120 may be implemented, include: Visual Basic runtime environment; Java® Virtual Machine runtime environment that is used to run, e.g., java® routines; or Common Language Runtime (CLR) to compile, e.g., Microsoft .NET™ applications into machine language before executing a calling routine. However, this listing of runtime environments provides examples only. Further, the example technologies described herein are not necessarily limited to just these managed execution environments. Even more particularly, the example implementations are not just limited to managed execution environments, for one or more examples may be implemented within testing environments and/or unmanaged execution environments.

An application compiled into IL may be referred to as "managed code," and therefore a runtime execution environment may be alternatively referred to as a "managed execution environment." It is noted that code that does not utilize a runtime execution environment for execution thereof may be referred to as native code applications.

Figure 2:
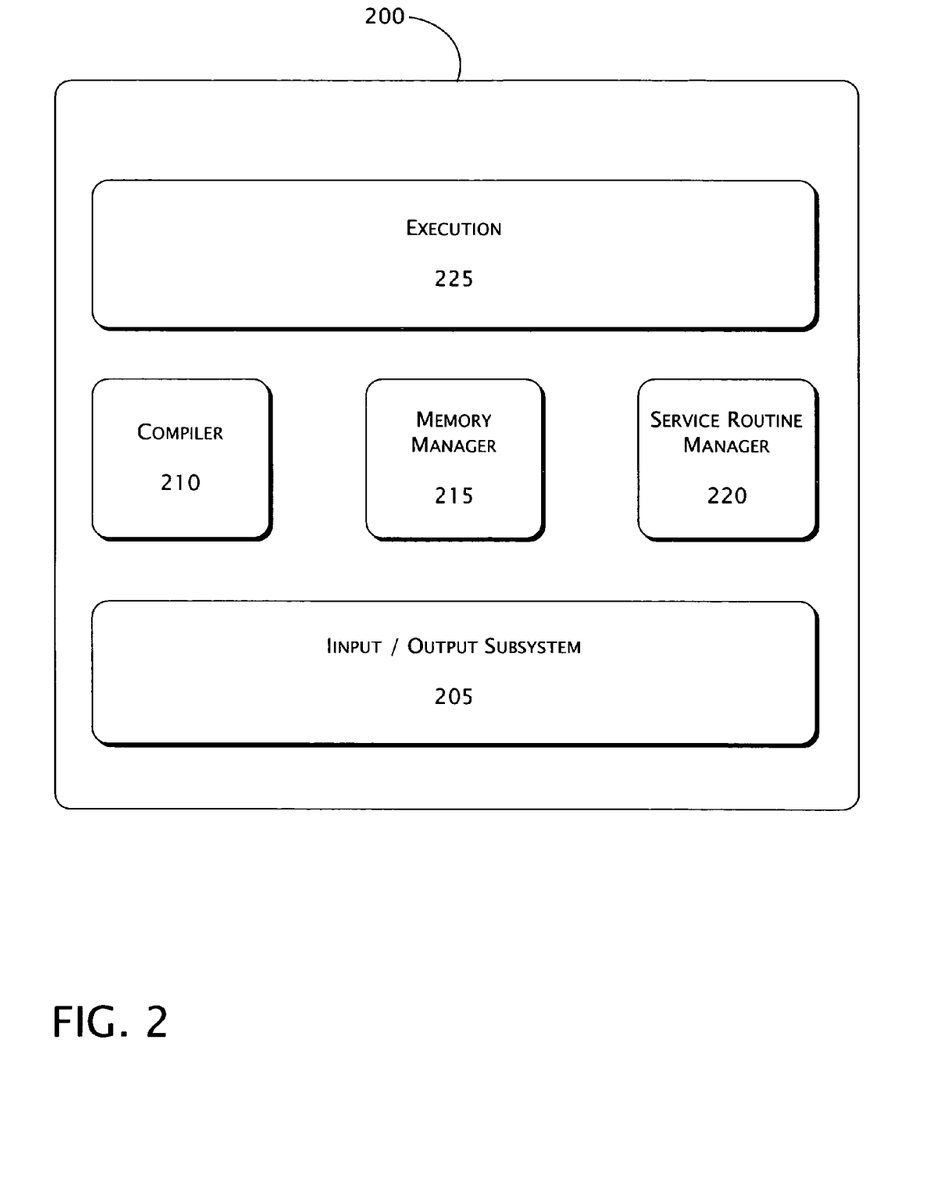
FIG. 2 shows an example of an execution environment for implementing example technologies related to extensible meta-data.

FIG. 2 shows example runtime execution environment 200 in which technologies associated with extensible meta-data 120 (see FIG. 1) may be implemented.

According to at least one example implementation, runtime execution environment 200 may facilitate execution of managed code for a computing device platform. Managed code may be considered to be part of a core set of application-development technologies, and may further be regarded as an application, program, function, or other assemblage of programmable and executable code that is compiled for execution in runtime execution environment 200 to provide a corresponding service to the computing device platform. In addition, runtime execution environment 200 may translate managed code at an interpretive level into instructions that may be proxied and then executed by a processor. Alternatively, managed code may be executed via an interpreter or a compiler, or a form of a compiler designed to run at install time as a native image. A framework for runtime execution environment 200 also provides class libraries, which may be regarded as software building blocks for managed applications.

Further, meta-data corresponding to at least a portion of managed code may be included as part of the compiled assembly resulting in the managed code or, alternatively, may be received in runtime execution environment 200 separate from the managed code. For example, the meta-data may be compiled as part of a separate assembly or the meta-data may be received in runtime execution environment 200 in an off-line manner. Regardless, the meta-data may be received to provide detailed amounts of information about one or more elements of the managed code.

Runtime execution environment 200 may provide at least partial functionality that may otherwise be expected from a kernel, which may or may not be lacking from a computing device platform depending upon resource constraints for a particular one of devices 105, 110, and 115 (see FIG. 1). At least one example of runtime execution environment 200 may implement the following: input/output (hereafter "I/O") routine management, compiling, memory management, and service routine management. Thus, runtime execution environment 200 may include I/O component 205, compiler 210, memory management component 215, service routine manager 220, and execution component 225. These components, which are to be described in further detail below, are provided as examples, which are not intended to be limiting to any particular implementation of runtime execution environment 200, and no such inference should be made. Thus, the components may be implemented in examples of runtime execution environment 200 in various combinations and configurations thereof.

I/O component 205 of runtime execution environment 200 may provide at least one of synchronous or asynchronous access to physical (e.g., processor and peripherals) and logical resources (e.g., drivers, or physical resources partitioned in a particular manner) associated with the computing device platform. More particularly, I/O component 205 may provide runtime execution environment 200 with robust system throughput and further streamline performance of code from which an I/O request originates.

Compiler 210 may refer to a module within runtime execution environment 200 that may interpret compiled IL into native machine instructions for execution in runtime execution environment 200. Further, in accordance with at least one alternative implementation of technologies associated with extensible meta-data 120, compiler 210 may dynamically analyze, for various purposes, the behavior of code modules associated with an application, program, function, or other assemblage of programmable and executable code. The code modules may or may not be loaded into runtime execution environment 200. If the code modules are loaded into runtime execution environment 200, compiler 210 may read, interpret, and/or otherwise analyze data entities associated with the code modules that render meta-data extensible, as described herein. The aforementioned reading, interpretation, and analysis may be performed without touching or affecting an executable portion of the code modules, and may be performed at compile time, initial runtime, or at any time thereafter during execution of an executable portion of the execution paths.

However, at least one example implementation of extensible meta-data 120 may not require reading, interpreting, or otherwise analyzing code compiled by compiler 210. Rather, extensible meta-data may be read, interpreted, or otherwise analyzed as pertaining to intermediate language code (i.e., "IL") that is distributed to runtime execution environment 200 in IL format rather than in a native platform execution format, and that is already compiled into any one of assemblies, methods, or types. A source of such IL 305 may be disposed in either of a non-managed execution environment or a separate implementation of a runtime execution environment on a same or separate one of devices 105, 110, and 115. The source may deploy the IL at, or prior to, install time for the application, program, method, function, or other assemblage of programmable and executable code to which the IL corresponds.

Memory management component 215 may be referred to as a "garbage collector," which implements garbage collection. Garbage collection may be regarded as a robust feature of managed code execution environments by which an object is automatically freed (i.e., de-allocated) if, upon a sweep or scan of a memory heap, an object is determined to no longer be used by an application, program, function, or other assemblage of programmable and executable code. Further functions implemented by memory management component 215 may include: managing one or more contiguous blocks of finite volatile RAM (i.e., memory heap) storage or a set of contiguous blocks of memory amongst the tasks running on the computing device platform; allocating memory to at least one application, program, function, or other assemblage of programmable and executable code running on the computing device platform; freeing at least portions of memory on request by at least one of the applications, programs, functions, or other assemblages of programmable and executable code; and preventing any of the applications, programs, functions, or other assemblages of programmable and executable code from intrusively accessing memory space that has been allocated to any of the other applications, programs, functions, or other assemblages of programmable and executable code.

Service routine manager 220 may be included as at least a portion of an application support layer to provide service functionality for physical and logical resources associated with the computing device platform. Example technologies (e.g., tools, methodologies, and systems) associated with extensible meta-data 120 may be managed by service routine manager 220. That is, technologies associated with extensible meta-data 120 may be implemented either singularly or in combination together by compiler 210 (as referenced above), service routine manager 220, or some other component of runtime execution environment 200, in accordance with various alternative implementations of such technologies. For example, service routine manager 220 may at least determine the existence of a variation or deviance of a meta-data schema, in relation to a known standard for the meta-data schema, associated with the one or more code modules to thereby enable the extensible meta-data to be read, analyzed, or otherwise interpreted. Such contribution by service routine manager 220 may be made without touching or affecting an executable portion of the code modules, at compile time, initial runtime, or at any time thereafter during execution of an executable portion of the one or more code modules.

Execution component 225 may enable execution of the one or more code modules included in the managed code for the computing device platform. More particularly, with regard to implementation of technologies associated with extensible meta-data 120, execution component 225 may serve as an exemplary component within runtime execution environment 200 that may implement one or more of the tools, systems, and processes for accessing extensible meta-data 120 to determine the existence of a variation or deviance of a meta-data schema for the one or more code modules to thereby enable the meta-data to be read, analyzed, or otherwise interpreted.

Figure 3:
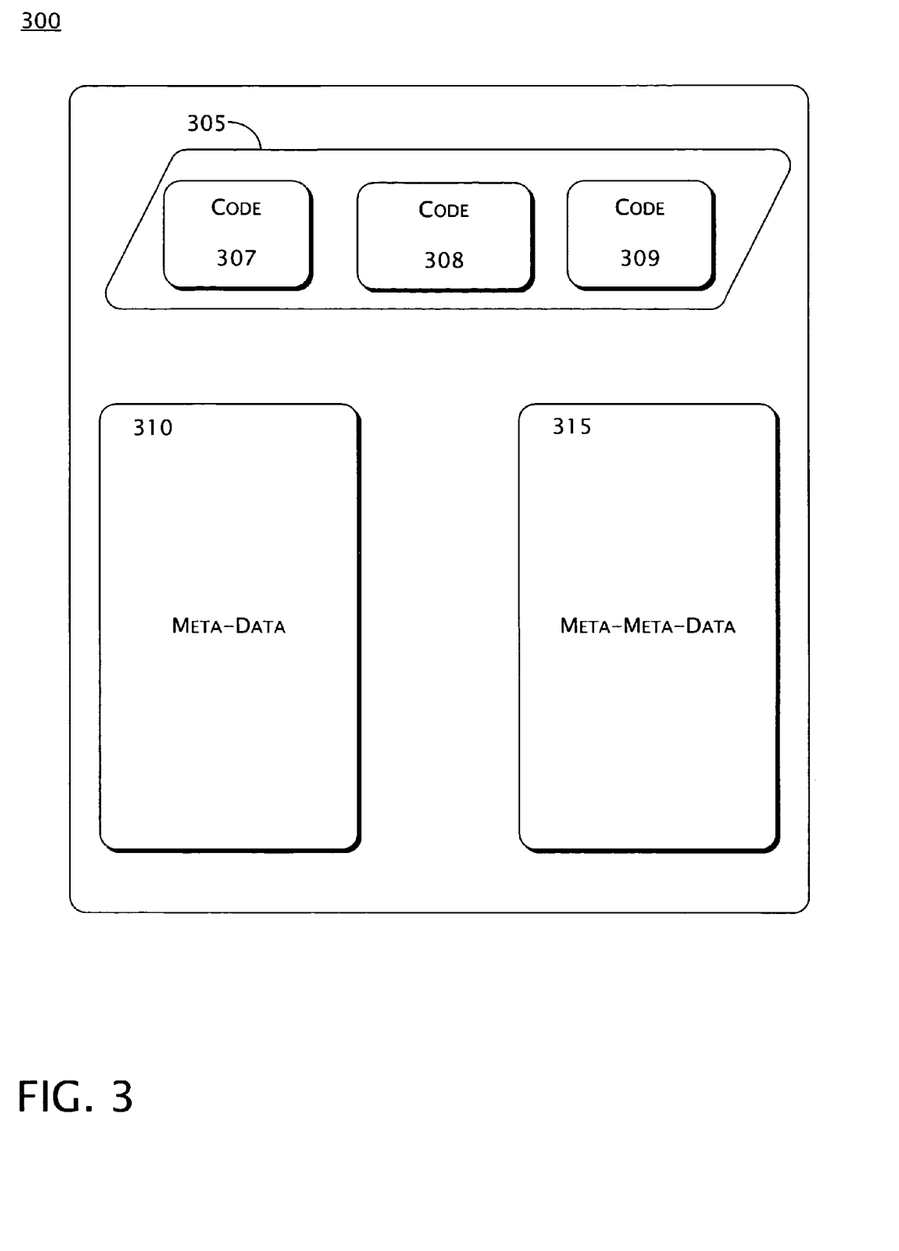
FIG. 3 shows an example of extensible meta-data corresponding to managed code.

FIG. 3 shows example code block 300 to illustrate an example implementation of extensible meta-data 120 (see FIG. 1) by leveraging data that is termed, for at least the purposes of this description, "meta-meta-data." The description of code block 300 may refer to devices described above in relation to network environment 100 in FIG. 1 and components described above in relation to runtime execution environment 200 in FIG. 2. However, these references to FIGS. 1 and 2 are intended to merely provide an enabling environment for extensible meta-data 120, and are not to be construed as limiting in any manner.

Code block 300 may be regarded as at least a portion of an application, program, function, or other assemblage of programmable and executable code that is compiled for execution in runtime execution environment 200. For instance, in an object data model, block 300 may referred to as object 300.

Block 305 may be regarded as an executable portion of an application, program, function, or other assemblage of programmable and executable code that is compiled for execution in runtime execution environment 200. As examples, block 305, including code modules 307, 308, and 309, may refer to program files or methods corresponding to object 300. Of course, the illustrated configuration of block 305 is provided only as an example, and alternative embodiments are not intended to be limited in any such manner.

Data construct 310 may include meta-data that, according to the present example, describes the data structures and functional structures of at least one of code modules 307, 308, and 309. That is, to execute the one or more code modules 307, 308, and 309 to which meta-data 310 corresponds in the context of runtime execution environment 200, data construct 310 may be accessed for a description of associated data structures. The data structures, which may alternatively be referred to as types, may include names of methods, arguments used in the methods, and return arguments. These data structures (i.e., types) are provided as examples only, and are not intended to be limiting in any manner.

The schema of meta-data 310 may be known as part of a published standard, or the schema may be standardized and built-in to runtime execution environment 200. According to the present implementations, schema may be referred to as a set of rules for constraining the structure of the meta-data in construct 310 and may include, for example, a standardized number of tables, a standardized number of columns per table, and standardized column descriptors for one or more of the tables.

Data construct 315 may be provided in object 300, among other reasons, to account for when the meta-data included in data construct 310 is not compiled in accordance with either the published standard or the standard that is built-in to runtime execution environment 200. That is, to read, analyze, or otherwise interpret data structures (i.e., types) that may have evolved to add new features, delete old features, or fix bugs in existing features, data construct 315 may be provided to render the meta-data included in data construct 310 extensible without requiring adjustments to any components of runtime execution environment 200.

Data construct 315, therefore, may include data that may be referred to as "meta-meta-data." That is, the meta-meta-data included in data construct 315 may refer to the schema of the meta-data included in data construct 310. Further, data construct 315 may be compiled as part of code block 300 as part of the meta-data stream. However, at least one alternative implementation of extensible meta-data 120 may contemplate data construct 315, and therefore the meta-meta-data included therein, being provided to runtime execution environment 200 in an off-line manner, by some alternative transport medium or in a separate schema stream. In addition, according to the examples described thus far, data construct 310 and data construct 315 are separate data entities; however, at least one alternative implementation may contemplate data construct 315 being integrated within data construct 310.

For example, the meta-meta-data included within data construct 315 may include one or more of the following: a comprehensive description of the schema of the meta-data included within data construct 310; a comparison of the schema of the meta-data included within data construct 310 with a standardized schema model that may be required for execution of code corresponding to block 305; or some other description of how the schema of the meta-data included within data construct 310 deviates from the standardized schema model that may be required for execution of code corresponding to block 305. A description of such deviations may pertain to, relative to the meta-data included within data construct 310, the number of tables, the number of columns per table, or the size of columns in one or more of the respective tables.

More particularly, with reference to the schema of the meta-data included in data construct 310, the meta-meta-data included within data construct 315 may include one or more of the following, in various combinations: at least one re-defined size of variable-size columns on a per-column basis; at least one definition of a new table; at least one definition of a new coded token type; a table count that exceeds a standardized amount; a column-count that exceeds a standardized amount; and a token type count that exceeds a standardized amount. At least one example of the separate schema stream may include a stream header, new coded token type descriptors, table descriptors for standardized tables, table descriptors for new tables, column descriptors for standardized table, and column descriptors for new tables.

Figure 4:
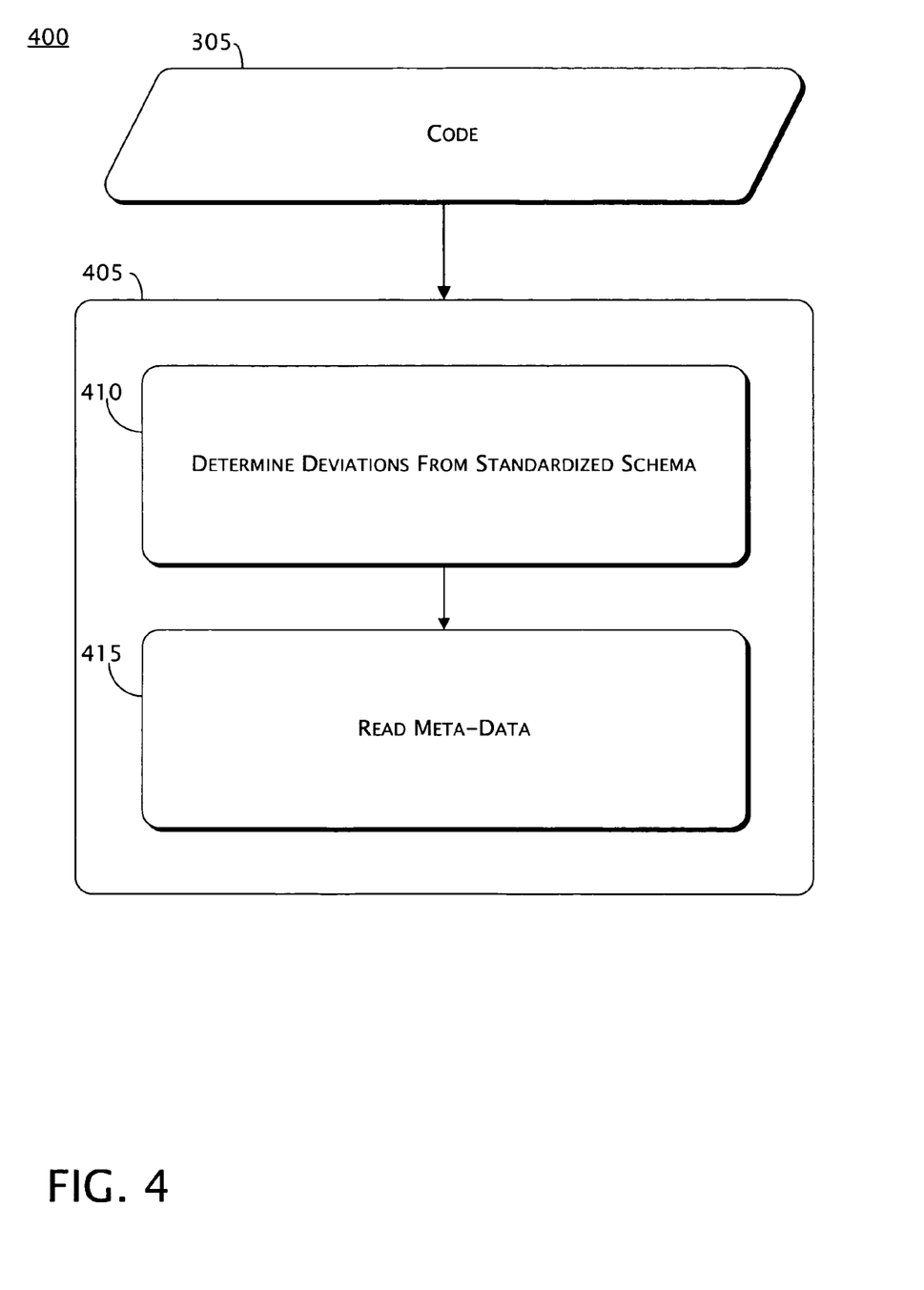
FIG. 4 shows an example dataflow for at least one implementation of extensible meta-data.

FIG. 4 shows example data flow 400 to illustrate an example implementation of extensible meta-data 120 (see FIG. 1).

Block 405 may refer to an execution environment in which one or more technologies related to extensible meta-data 120 may be implemented. The present description has thus far referred to runtime execution environment 200 as the environment in which extensible meta-data 120 may be implemented. However, the example implementations are not just limited to managed execution environments. Rather, alternative examples of extensible meta-data 120 may be implemented within testing environments and/or unmanaged execution environments. Regardless, the description of dataflow 400 may refer to various operations being performed by one or more modules associated with devices corresponding to network environment 100 (see FIG. 1), components corresponding to runtime execution environment 200 (see FIG. 2), and code module 305 and data constructs 310 and 315 (see FIG. 3). In addition, the operations may be implemented as hardware, firmware, or software, either singularly or in various combinations together.

Block 410 may refer to a module of execution environment 405 examining, analyzing, or otherwise reading the meta-meta-data included in data construct 315 to determine that deviations exist between the meta-data schema of input code 305, as indicated by the meta-data included in data construct 310, and the published standard or otherwise standardized schema expected by execution environment 405. An example of such module may include service routine manager 220 of runtime execution environment 200.

More particularly, for compiled code 305 (i.e., IL) to be read or executed within execution environment 405, the schema for the meta-data is expected to be predictable. For example, referring to the examples of FIGS. 2 and 3, runtime execution environment 200 may anticipate the schema for meta-data included in data construct 310 to include 42 tables with 64 columns each. Thus, at block 410, deviations from standardized type descriptors, table descriptors, and column descriptors may be detected.

Deviations from a standardized meta-data schema model may be detected by reading, interpreting, or otherwise analyzing the meta-meta-data included in data construct 315 (see FIG. 3). Thus, the meta-meta-data may include a comprehensive description of the schema of the meta-data. Alternatively, the data included in data construct 315 may list differences between the schema of the meta-data included in data construct 310 with the standardized schema model, thereby circumventing a need for a thorough review of the meta-data included within data construct 310.

Furthermore, meta-meta-data of data construct 315 may be compiled as part of code 305 or provided to execution environment 405 in a separate schema stream (e.g., in an off-line manner or by some alternative transport medium).

Block 415 may refer to a module within execution environment 405 (e.g., service routine manager 220) examining, analyzing, or otherwise reading the meta-data of input code 305. That is, having been informed of how the meta-data included in data construct 310 may deviate from a standardized meta-data schema model, the aforementioned module within execution environment 405 may be enabled to read, interpret, or otherwise analyze the extensible meta-data included in data construct 310.

By the description above, pertaining to FIGS. 1-4, meta-data of code input to a particular execution environment may be rendered extensible. For instance, meta-data schema corresponding to compiled intermediate language code (i.e., IL) may deviate from a standardized structure without requiring re-configuring the runtime execution environment into which a corresponding application, program, function, or other assemblage of programmable and executable code. However, the example implementations described herein are not limited to just the environment of FIG. 1, the components of FIGS. 2 and 3, or data processing flow of FIG. 4. Technologies (e.g., tools, methodologies, and systems) associated with extensible meta-data 120 (see FIG. 1) may be implemented by various combinations of the components described with reference to FIGS. 2 and 3, as well as in various orders of the blocks described with reference to FIG. 4.

Further, the computer environment for any of the examples and implementations described above may include a computing device having, for example, one or more processors or processing units, a system memory, and a system bus to couple various system components.

The computing device may include a variety of computer readable media, including both volatile and non-volatile media, removable and non-removable media. The system memory may include computer readable media in the form of volatile memory, such as random access memory (RAM); and/or non-volatile memory, such as read only memory (ROM) or flash RAM. It is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electric erasable programmable read-only memory (EEPROM), and the like, can also be utilized to implement the example computing system and environment.

Reference has been made throughout this specification to "an example," "alternative examples," "at least one example," "an implementation," or "an example implementation" meaning that a particular described feature, structure, or characteristic is included in at least one implementation of the present invention. Thus, usage of such phrases may refer to more than just one implementation. Furthermore, the described features, structures, or characteristics may be combined in any suitable manner in one or more implementations.

One skilled in the relevant art may recognize, however, that code module initialization may be implemented without one or more of the specific details, or with other methods, resources, materials, etc. In other instances, well known structures, resources, or operations have not been shown or described in detail merely to avoid obscuring aspects of the invention.

While example implementations and applications of the code module initialization have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

We claim:

1. A method performed by a managed execution environment operating on a computer comprising a processor and associated memory structures, the managed execution environment for executing assemblies compiled to run in the managed execution environment, every such assembly including bytecode and metadata produced by a compiler for the managed execution environment, the metadata of each assembly received by the runtime execution environment describing data types referenced in the compiled bytecode of the assembly, the runtime execution environment having a built-in ability to interpret the structure of any metadata that is structured in conformance with a standard metadata schema of the runtime execution environment, the built-in ability allowing the runtime execution environment to interpret the structure of any assembly's metadata when such assembly does not include the standard metadata schema, the standard metadata schema defining the structure that metadata must have to be interpreted by the built-in ability of the runtime execution environment, the method performed by the runtime execution environment comprising:

receiving one of the assemblies compiled to execute in the runtime execution environment, where the metadata in the assembly is not structured in accordance with the standard metadata schema of the managed execution environment;

analyzing the received assembly to determine that the metadata of the assembly is not structured in accordance with the standard metadata schema;

in response to determining that the metadata of the assembly is not structured in accordance with the standard metadata schema, accessing meta-meta-data included with the assembly, the meta-meta-data extending and/or modifying the structure defined by the standard schema and using the meta-meta-data to interpret the structure of the metadata included with the assembly to obtain from the metadata information about data types referenced in the bytecode;

executing the assembly in accordance with the data type information.

2. A method according to claim 1, wherein the meta-meta-data describes a deviation in a number of tables relative to a number of tables defined in the standard metadata schema.

3. A method according to claim 1, wherein all of the assemblies compiled for the runtime execution environment contain their metadata in tables, and wherein the meta-meta-data describes a deviation in a number of columns per table relative to a number of columns per table defined in the standard metadata schema.

4. A method according to claim 1, wherein the meta-meta-data describes a deviation in a size of columns relative to a size of columns defined in the standard metadata schema.

5. A method according to claim 1, wherein the meta-data is compiled in an intermediate language.

6. A method according to claim 1, wherein the meta-meta-data comprises a schema that extends the standard metadata schema, wherein the determining comprises reading the meta-meta-data, and the using the meta-meta-data comprises comparing the schema with the standard metadata schema.

7. A method according to claim 1, wherein the metadata of the received assembly is not structured in accordance with the standard metadata schema due to tables storing the metadata of the received assembly having more columns than defined in the standard metadata schema.

8. A method according to claim 1, wherein the metadata of the received assembly is not structured in accordance with the standard metadata schema due to tables storing the metadata of the received assembly having column types not defined in the standard metadata schema.

9. A method according to claim 1, wherein the metadata of the received assembly is not structured in accordance with the standard metadata schema due to tables storing the metadata of the received assembly having sizes of columns not defined in the standard metadata schema.

10. A method according to claim 1, wherein the metadata of the received assembly is not structured in accordance with the standard metadata schema due to the received assembly having a greater number of tables storing the metadata than defined in the standard metadata schema.

11. Computer readable storage media storing information to enable a computing device to execute a managed execution runtime environment that provides virtual machines to execute managed code and that provides memory management and garbage collection when executing managed code, the runtime environment configured to obtain data type metadata from every assembly executed thereby, where every assembly compiled for execution in the runtime environment comprises compiled bytecode and metadata describing data types in the compiled bytecode, where the runtime environment requires the metadata of every such assembly for execution of the assembly, the runtime environment having a built-in ability to read the structure of the metadata of an assembly when such metadata is structured according to rules of a standard metadata schema, wherein the runtime environment can interpret the structure of any assembly's schema-conforming metadata when the assembly does not include the standard metadata schema, the runtime environment configured to execute assemblies comprised of metadata that does not structurally conform to the standard metadata schema by performing a process comprising:

receiving an assembly for execution;

analyzing the assembly to detect that the metadata of the assembly is not structured in conformance with the standard metadata schema;

detecting the presence of custom metadata schema in the assembly, the custom metadata schema extending the standard metadata schema to allow the metadata of the assembly to have structure that does not conform to the standard metadata schema alone but does conform to the standard metadata schema as extended by the custom metadata schema; and in response to the presence of the custom metadata schema, using the custom metadata schema to interpret the structure of the assembly's metadata to obtain, from the metadata, data type information being necessary for the runtime execution environment to execute the assembly's bytecode, the data type information describing data types referenced in the bytecode of the assembly.

12. Computer readable storage media according to claim 11, wherein the data type information comprises names of methods, arguments used in the methods, and return arguments of objects in the received assembly.

13. Computer readable storage media according to claim 11, wherein the standard metadata schema is publicly known and available.

14. A computer comprising a processor and memory configured with a managed code runtime environment to execute every compiled assembly it receives for execution by extracting metadata from the assembly being executed and obtaining data type information there from to execute bytecode included in the compiled assembly, the managed code runtime environment providing memory management, including garbage collection, and a virtual machine, to execute managed code, the runtime environment having a built-in ability to interpret the structure of metadata stored in any compiled assembly when such metadata is stored in the assembly with structure that conforms to a standard metadata schema of the runtime execution environment, the runtime execution environment on the computer executing a compiled assembly by performing a process comprising:

receiving the compiled assembly, the compiled assembly comprising one or more code modules comprising compiled code executable by the managed code runtime environment and comprising schema information describing extension or modification of the standard metadata schema, where the metadata is included with the received assembly and the metadata in the assembly has structure not conforming to the standard metadata schema alone but conforming to the standard metadata schema as extended or modified by the metadata schema information; and analyzing the assembly to determine that the metadata in the assembly is not structured in the assembly in conformance with the standard metadata schema, and in response using the metadata schema information in the assembly to interpret the structure of the metadata in the received assembly to obtain data type information of data types referenced in the bytecode of the assembly when the runtime environment is executing the bytecode.

15. A computing device comprising a processor and memory configured with a runtime execution environment that executes compiled execution units in environments provided by the runtime execution environment, the runtime execution environment providing memory management, including garbage collection, for the compiled execution units, each compiled assembly comprising a package that includes metadata and separate compiled bytecode, the metadata of a compiled assembly describing data types in the corresponding compiled bytecode, the runtime execution environment having the built-in ability to interpret metadata that structurally conforms to a standard schema of the runtime execution environment, the runtime execution environment performing a process comprising:

receiving standard compiled assemblies, each standard compiled assembly not including schema describing structure of the metadata in the standard compiled assembly, the runtime execution environment using the built-in ability to interpret the structure of the metadata in a standard compiled assembly to thereby extract data type information describing data types referenced in compiled bytecode of the assembly, the data type information being used to execute the corresponding compiled bytecode;

receiving non-standard compiled assemblies, each non-standard compiled assembly including metadata that is stored in the non-standard compiled assembly with structure that does not conform to the standard schema, and each non-standard compiled assembly including schema information extending or modifying the standard schema, the schema information of a non-standard compiled execution unit enabling the runtime execution environment to interpret the structure of the metadata in the non-standard compiled assembly to obtain data type information describing data types referenced in compiled bytecode of the assembly, the data type information being used to execute the corresponding compiled bytecode.

* * * * *